Oct. 5, 1965  A. PHILLIPS  3,209,697
VARIABLE STROKE INERTIAL CONVERTER
Filed Feb. 25, 1963   9 Sheets-Sheet 1

INVENTOR
ADRIAN PHILLIPS

Oct. 5, 1965

A. PHILLIPS 3,209,697

VARIABLE STROKE INERTIAL CONVERTER

Filed Feb. 25, 1963

Inventor
Adrian Phillips
By Cushman, Darby & Cushman
Attorneys

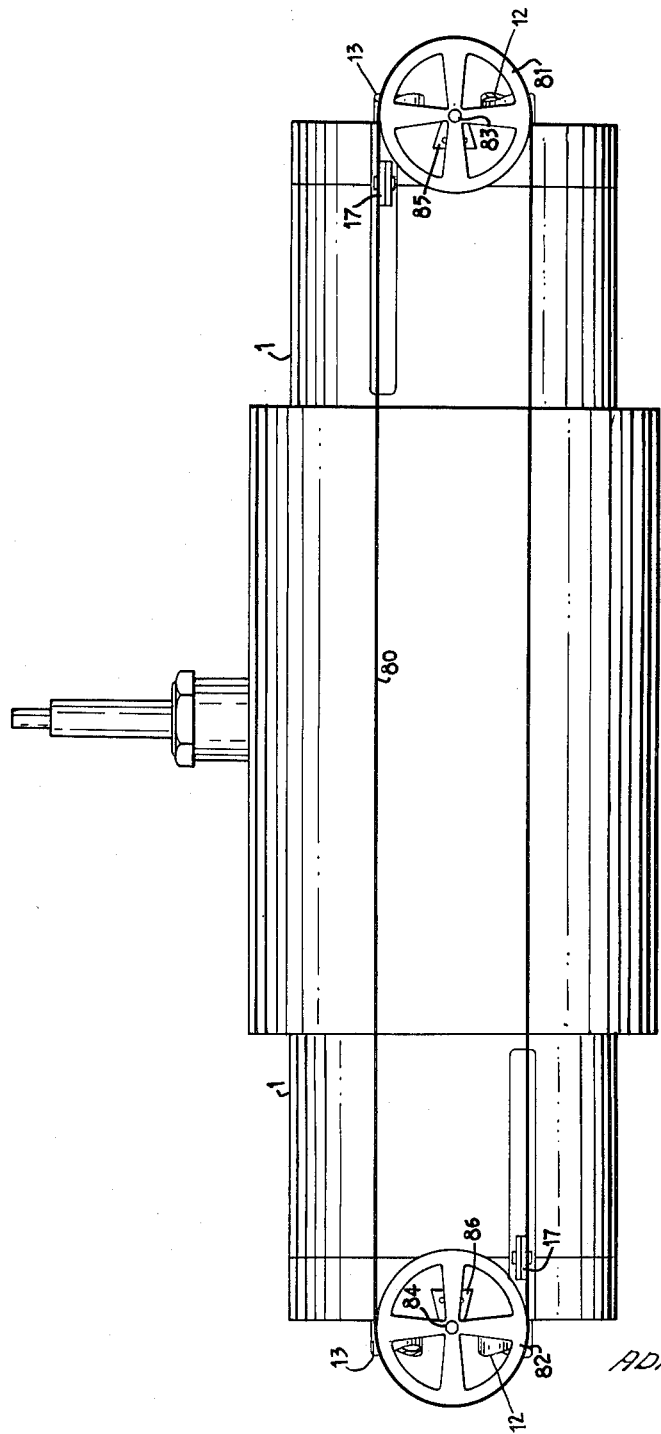

INVENTOR
ADRIAN PHILLIPS

Oct. 5, 1965 A. PHILLIPS 3,209,697
VARIABLE STROKE INERTIAL CONVERTER
Filed Feb. 25, 1963 9 Sheets-Sheet 8

INVENTOR
ADRIAN PHILLIPS

United States Patent Office 3,209,697
Patented Oct. 5, 1965

3,209,697
VARIABLE STROKE INERTIAL CONVERTER
Adrian Phillips, 1316 Lakeshore Highway E.,
Oakville, Ontario, Canada
Filed Feb. 25, 1963, Ser. No. 260,410
10 Claims. (Cl. 103—54)

This invention relates to power supply units and more particularly to a free piston device for supplying a hydraulic fluid under pressure.

At the present time, power from piston operated internal combustion engines to be employed in shaft driven apparatus is in general taken from a crankshaft to which are attached connecting rods carrying the pistons running in combustion cylinders. If hydraulic power is required, it is normal to drive a pump, frequently of the gear type, from the engine crankshaft. It has long been recognized that fluid, and particularly liquid, power transmission provides many advantages over shaft transmission even when the ultimate output required is rotary. The extra complication and loss of efficiency in transmission from prime mover to hydraulic pump and thence to hydraulic engine has led, however, to the almost exclusive adoption, particularly in transport vehicles, of shaft transmission with gearing as required.

It is an object of the present invention to overcome the dilemma presented by the prior art by providing an internal combustion device which generates hydraulic fluid pressure directly without the interposition of rotating shaft mechanisms and which will thereby obviate much of the loss of energy and inconvenience inherent in associated gear, shaft, and pump trains.

More specifically, in accordance with the present invention, there is provided an engine for delivering hydraulic fluid under pressure which comprises, a cylinder, a piston in the cylinder for compressing a combustible charge therein and for extracting work from said charge upon combustion resilient means for receiving kinetic energy from and being placed under compression by said piston during the combustion stroke and for returning kinetic energy to said piston on the compression stroke, said resilient means being mounted and operatively connected to press upon a hydraulic compressing device and to express hydraulic fluid from said device under pressure when said resilient means is placed under a predetermined compression by said piston.

A description of the invention now follows and reference will be made to the accompanying drawings in which:

FIGURE 5 shows a side view of the apparatus of FIGURE 1 with a second type of piston synchroniser;

Figure 1:
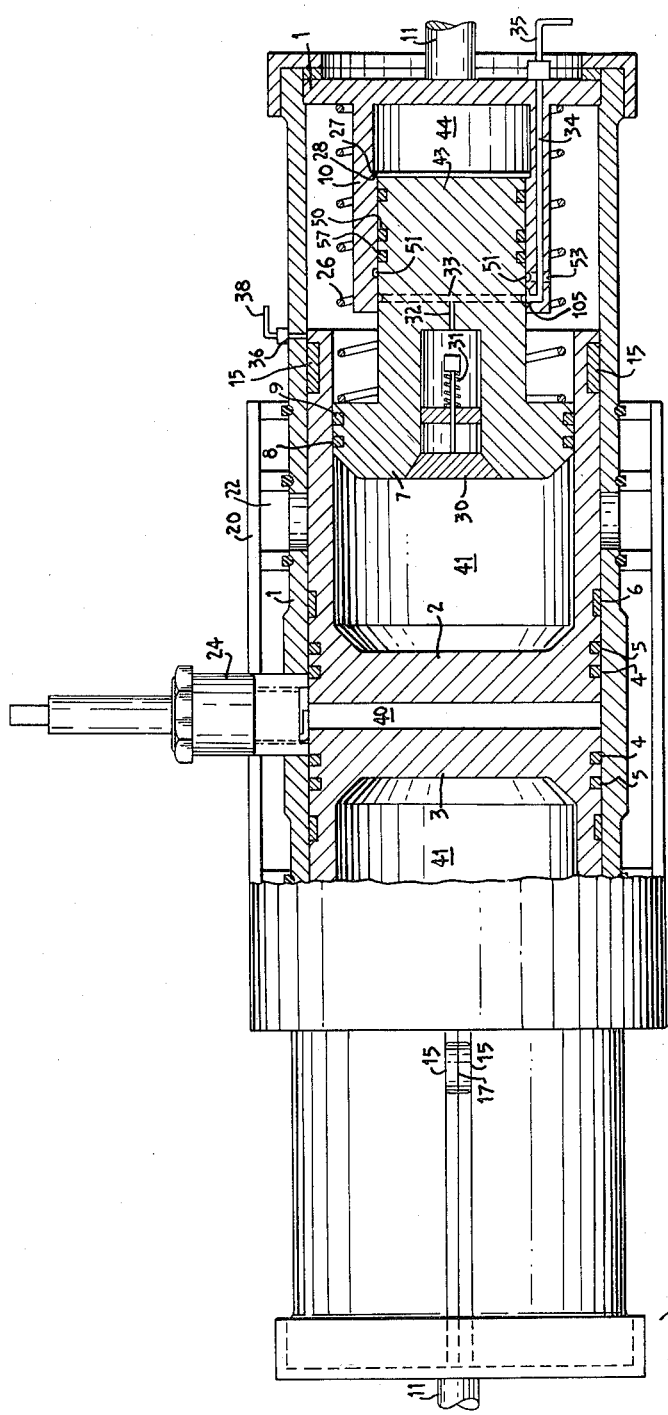
FIGURE 1 shows a side view partly in section of an engine constructed in accordance with the teaching of the invention.
Figure 3:
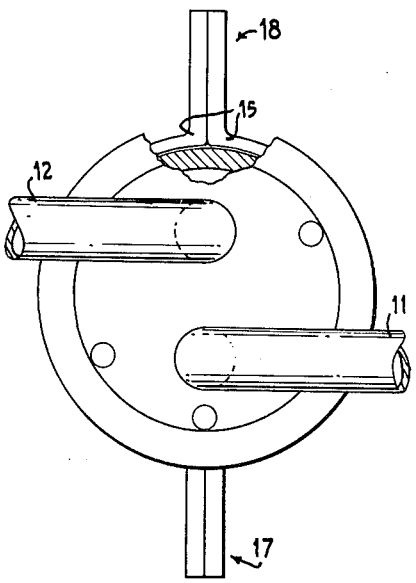
FIGURE 3 shows an end view again partly in section of the apparatus of FIGURES 1 and 2.

Having reference to FIGURE 1, a cylinder 1 receives two opposed pistons 2 and 3 which are free to slide within it. Each piston carries a pair of sealing rings 4 and 5 and a support ring 6. Since the engine to be described is essentially symmetrical, only piston 2 and its associated parts will be described. Piston 3 and its parts are similar. Piston 2 is machined internally to provide a cylinder for a bounce piston 7, having sealing rings 8 and 9. Bounce piston 7 in turn, at its far end 43, is received within a hydraulic cylinder 10 mounted rigidly with respect to cylinder 1. This cylinder 10 can accept fluid through a pipe 11 and express it through a pipe 12. As explained later with reference to FIGURE 6, one-way check valves may be provided in pipes 11 and 12 (not shown). Piston 7 also carries a pair of semi-circular clip rings 15 shown in detail in FIGURE 3, which embrace the piston skirt and provide projecting lugs 17 and 18 for synchronising take-off. These clips also provide sliding support in the cylinder for the skirt of piston 2 and reduce any tendency for the piston to twist obliquely in cylinder 1. Cylinder 1 is surrounded by a coolant jacket 20 which includes passages 21 and 22 for combustion gas entry and exhaust, respectively. Fuel may be led in with the combustion gas, or it may be injected into cylinder 1 directly as described below. Inlet ports 23 and exhaust ports 24 are provided in the walls of cylinder 1 to communicate with passages 21 and 22, respectively. An ignition plug 24 is preferably provided and may be of the spark or glow type dependent upon whether the device is operated on the spark ignition or compression ignition cycles, in other instances, the plug may be replaced by a fuel injector nozzle when the engine is operated on the diesel cycle. A spring 26 is provided under the head of piston 7 acting positively to urge piston 7 into its fully extended position with respect to hydraulic cylinder 10. A stop flange 27 is provided on piston 7 which engages a shoulder 28 in cylinder 10 to prevent piston 7 being fully withdrawn. Within piston 7 a spring-loaded poppet valve 30 is held in its closed position by means of a spring 31. The cavity on the underside of the poppet valve connects through a passage 32, and annular groove 33 to a passage 34 within the walls of cylinder 10. Passage 34 is connected to an external air supply line 35. Lubrication may be provided for piston 2 by means of a small oil passage 36 fed from a suitable low pressure oil supply lead, or from a pump (not shown) through line 38. Rings 50 are provided on hydraulic piston 43 (integrally formed with piston 7) in order to seal it properly within cylinder 10. An annular drainage channel 51 for hydraulic fluid in the wall of cylinder 10 collects fluid leaking past the piston for discharge through a boring 53, this fluid thus does not tend to contaminate the air supply groove 33 and enter space 41 within piston 2.

It is desirable for high power output that the combustion mixture be supercharged, which is conveniently achieved by passing the exhaust gases through a turbine 130 (FIGURE 2) whose shaft 131 carries a rotary compressor 132. The exhaust turbine and compressor may be of any type well known in the art designed for the rate of flow of combustion gases encountered. Two rotary blowers arranged back to back, fitted eccentrically within cylindrical volute casings with peripheral intake and axial discharge for the turbine and axial intake and peripheral discharge for the compressor may be used, for example. Air for combustion is induced through intake 133 of carburetter 134 where it is mixed with fuel entering through line 135. The combustion charge is then compressed in 132 and led to inlet manifold 21 and thence to ports 23. Alternatively, fuel may be injected into cylinder 1 and the carburetter 134 may be dispensed with. Exhaust gases pass from ports 24 through manifold 22 to turbine 130 and to exhaust discharge 136.

The running operation of the device is as follows:

Let us assume that a combustible mixture is present in the space 40 between pistons 2 and 3 and in FIGURE 1 and is ignited. Pistons 2 and 3 will begin to recede from one another, accelerating in opposite directions in the cylinder 1. Air contained within the space 41 of the pistons 2 and 3 is compressed against its piston 7 until such time as the pressure of air within the space exerts a force on the piston 7 which no longer can be supported by the pressure of hydraulic fluid within space 44. Hydraulic piston 43 on piston 7 thereupon starts to force fluid from within space 44 out through pipe 12. This explanation is somewhat simplified as the later discussion with respect to FIGURE 10 will show. As pistons 2 and 3 recede, exhaust ports 24, being longer open before the intake ports 23 and the charge of burnt gases starts to move in the right hand direction in FIGURE 2 as shown by arrows 45. The flow of exhaust gases through the exhaust ports, as the intake ports 23 are gradually uncovered, induces a new charge of fuel air mixture to enter from passage 21 while scavenging the burnt gases through passage 22. This flow is assisted by the supercharging effect of the compressor 132. At about this stage, particularly with the lowered pressure within space 40, pistons 2 and 3 are brought to a standstill by the resilient opposing forces exerted on them from the compressed air in spaces 41. Pistons 2 and 3 are then returned towards one another on the compression stroke accelerating under the action of the pressure in space 41 and compressing the fresh charge now in space 40. It is clear that as the space 40 diminishes in volume, the increasing pressure of the charge within this space will eventually decelerate pistons 2 and 3 to a standstill so that they again take up the initial position of FIGURE 1. While the pistons 2 and 3 are approaching one another, the air within space 41 is expanding. When the pressure of this air is sufficiently low, the action of spring 26 and residual pressure in cylinder 10 moves piston 7 in the direction tending to withdraw it from cylinder 10 and allowing fluid to flow into space 44 through pipe 11. Again, this explanation is simplified and a fuller description will be made with reference to FIGURE 10. Should some air have been lost from space 41 by blow-by past rings 8 and 9, pipe 35 supplying air at approximately atmospheric pressure will allow make-up air to flow into the cavity behind the poppet valve 30 and through the valve and into space 41. In a manner as will be described in the embodiment of FIGURE 10, supercharged air may sometimes usefully be introduced into space 41. It should be noted that the spring 39 is weak and only sufficient to hold the poppet valve on its seat against a pressure of 1 or 2 lbs./in.² The charge in space 40 is then ignited either by plug 24, for instance through the making of a contact determined by the position of the ears 17, or 18, or by compression ignition, and the process repeats itself.

It is clear, particularly when the linkage connecting the two pistons 2 and 3 (exemplified in FIGURES 4, 5, 9 and 10) ensures that they remain in synchronism, hydraulic pressure output will be provided through both pipes 12 simultaneously. The fluid under pressure from pipe 12 may be used for various purposes and will be found particularly useful, for instance for driving hydraulic motors mounted on motor vehicle wheels, or on ships' propeller shafts.

Figure 6:
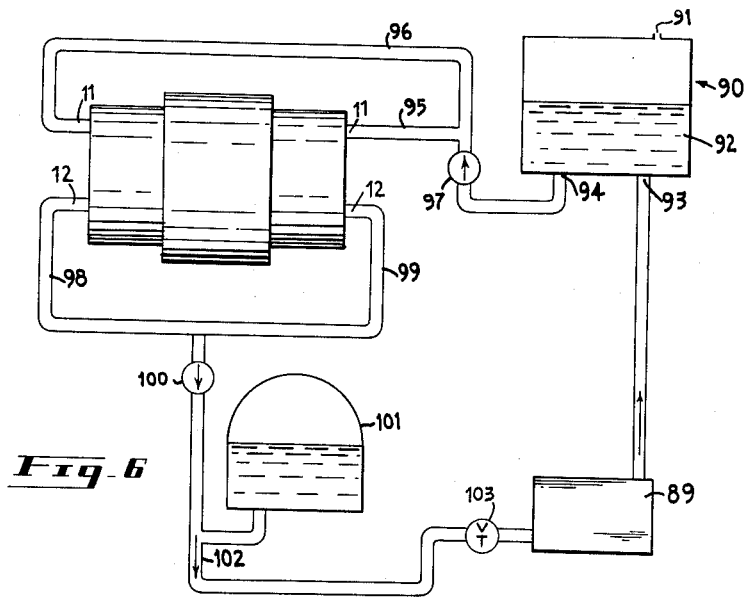
FIGURE 6 shows a schematic diagram of a hydraulic circuit which may be used with an engine constructed in accordance with the invention.

As shown in FIGURE 6, a typical hydraulic system in which the engine may be connected comprises, a fluid reservoir 90 which is vented at 91 and contains liquid 92. An inlet 93 for the reservoir from hydraulic services 89 is provided in the base of the reservoir. An outlet 94 permits fluid to be taken to the engine through pipes 95 and 96, respectively, past a check valve 97. Fluid leaving the engine through pipes 98 and 99 after being placed under pressure passes through adjustable valve 100 which may be preset to open at a desired pressure. Valve 100 thus also acts as a check valve. The fluid flows to an accumulator 101 where it is held under pressure until such time as it required for use by the hydraulic services, being then transmitted through pipe 102 and valve 103. As an alternative arrangement, which provides for lower losses in the hydraulic transmission, the hydraulic cylinders 10 at each end of the engine can be connected together through a small bore balance tube. Each outlet pipe 12 (see FIGURES 2 and 3) is provided with a one-way check valve (not shown) adjacent its cylinder 10 and is connected through large bore tubing to a junction from which the fluid can flow through a single tube to adjustable valve 100 and thence to the accumulator 101. Inlet check valves (not shown) are then also provided in pipes 11 adjacent their respective cylinders 10 which inlets are fed independently from large bore tubing connected to the reservoir 90 (or from a junction adjacent the reservoir and fed from the reservoir).

Figure 2:
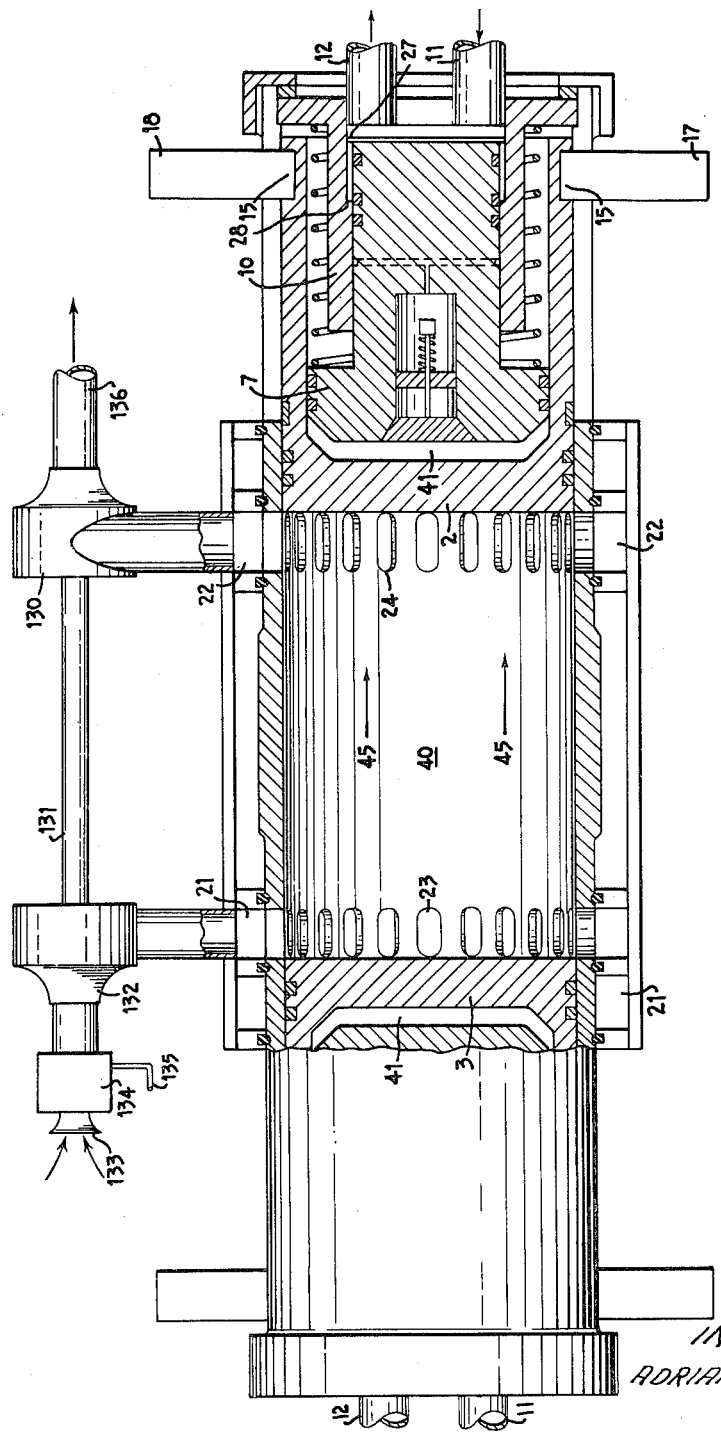
FIGURE 2 shows a partly sectioned plan view of the apparatus of FIGURE 1.
Figure 4:
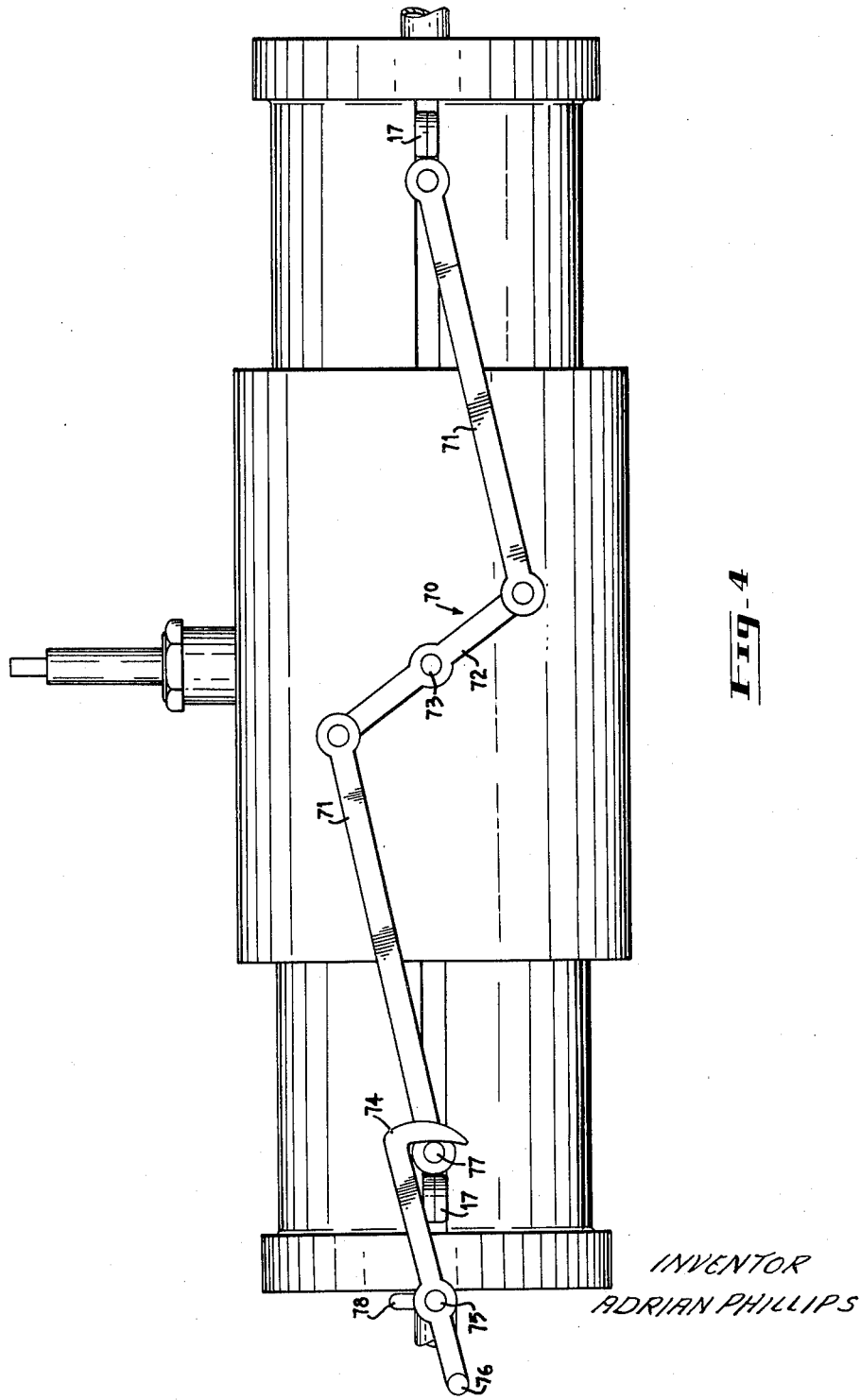
FIGURE 4 shows a side view of the apparatus of FIGURE 1 with one type of piston synchroniser.

In FIGURE 4, there is shown a side view of the apparatus of FIGURES 1 and 2 with a synchronising mechanism 70 for ensuring that the two pistons 2 and 3 move in phase with one another The lugs 17 are linked through pitman arms 71 to a link 72 pivoted about an axle 73. A catch 74 used for starting and pivoted about axle 75 with releasing handle 76 engages a pin 77 coupling one of the lugs 17 to its pitman arm 71. Its operation for the purposes of starting will be described later. A similar synchronising mechanism 70 is placed on the opposite side of the device connected to lugs 18, with a catch 74 similar to which it is linked through stirrup 78.

FIGURE 5 shows an alternative embodiment of a synchronising arrangement which additionally allows cross coupling between ears 17 and 18. This coupling may be necessary in instances where pistons 2 and 3 tend to jam obliquely in the cylinder 1, particularly at the moment of starting when they are loaded by pressure in space 41. Lugs 17, in this instance, are connected to a metal tape 80 which passes round a pair of wheels 81 and 82. Behind each wheel 81 and 82 is a similar wheel on the opposite side of the cylinder 1 connected to its respective wheel 81 and 82 through a shaft 83 and 84 mounted in journal bearings 85 and 86. A tape similar to 80, links lugs 18. For starting purposes, a release link similar to 74 may be made to engage round the lugs 17 and 18 of a chosen piston 2 or 3. In this embodiment, pipes 11 and 12 have been shifted from their positions in FIGURES 1 and 2 so that the axles 83 and 84 can be accommodated. A further synchroniser will be described in considering FIGURES 9 and 10.

The system of opposed pistons tends to be self synchronising and, in some instances, it may be suitable to dispense with any specific synchronising apparatus between the two pistons 2 and 3. Thus, each piston 2 and 3 could be provided with a resilient stop to prevent its approaching beyond the centre of cylinder 1. If then one piston tended to be slightly in advance of the other, it would be arrested at the top so that it could not prevent the other piston from coming to the proper position for the top of its stroke.

When the apparatus is to be started, pistons 2 and 3 are placed in the position shown in FIGURE 2 and are held by swinging the catch members 74 of FIGURE 4 into position. Air under pressure is then introduced through pipe 35 behind valve 30 so that compressed air enters the space 41. (The point of connection between line 34 and groove 33 is extended a short distance in the direction of movement of piston 7, as shown at 105 in FIGURE 1, because the application of pressure into the space 41 for starting tends to depress the piston slightly into cylinder 10 which would otherwise cut off the supply of air to groove 33.) The turbine 130 is rotated by passing compressed air into it in place of exhaust gases, or by rotating shaft 131 by suitable drive means, such as a belt (not shown). Intake mixture is thus blown by compressor 132 in through ports 23 and out through ports 24. Catch 74 is then released by pressing down on handle portion 76 (FIGURE 4), pistons 2 and 3 accelerate towards one another, compressing the charge in space 40 and at a certain point the charge is ignited either by plug 24 or by diesel action. The pistons start to reciprocate, each fresh charge firing at or about the top of each stroke, line 35 is connected to atmosphere, exhaust is diverted to pass through the turbine (when compressed air has been used to turn it initially, and the engine continues operation, as described earlier.

Figure 7:
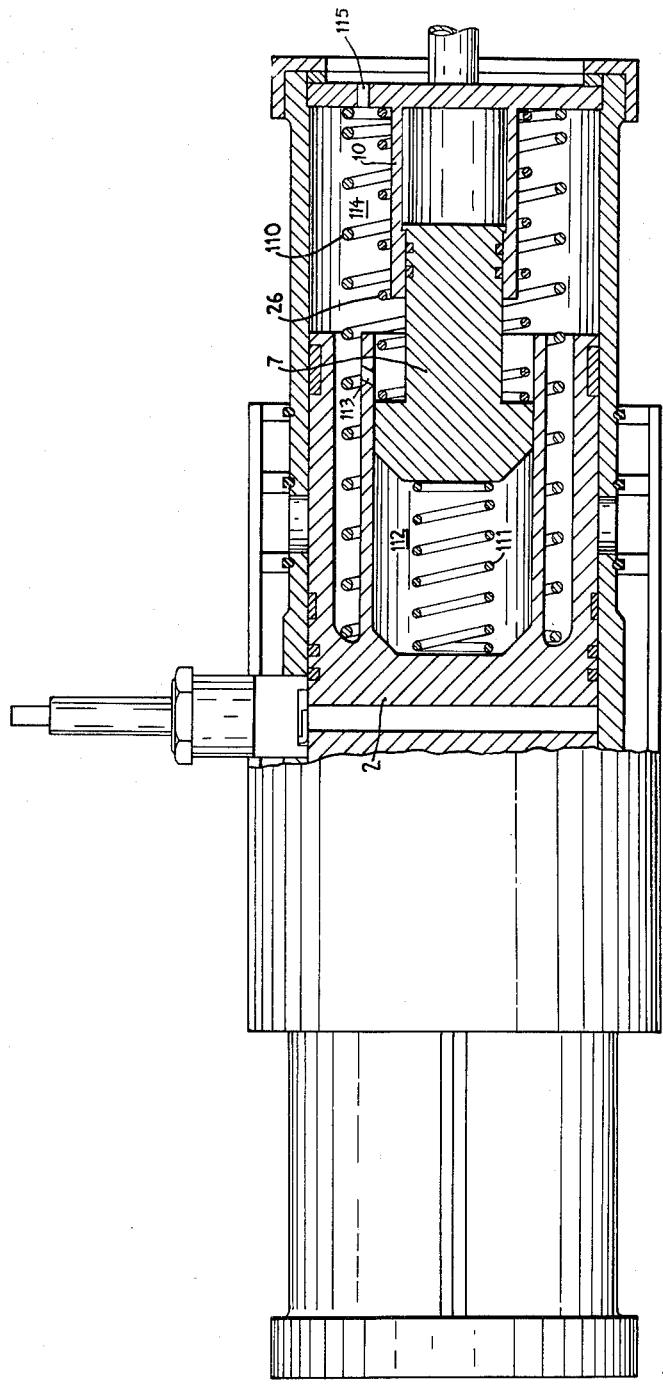
FIGURE 7 shows a partially sectioned side view of an apparatus constructed in accordance with the teaching of the invention employing an alternative internal structure.

In some instances, it may be found desirable to arrange for the pistons 2 and 3 to be returned on the compression stroke by means of suitable springs 110 (FIGURE 7). The head of piston 7 can then be made smaller than in the embodiment described earlier and may be assisted in its cushioning action on piston 2 by a further spring 111 as well as the air compressed in space 112. Cylinder 10, in FIGURE 7, is relatively smaller in diameter than before, in order for it to be accommodated within the skirts of piston 2, but the same power can be extracted by raising the exhaust pressure of cylinder 10. It is not necessary to introduce compressed air into space 112 for starting since pistons 2 need merely be pulled down against their springs 110 and held by catch 74 (FIGURE 4). When the catch is released (after introducing combustion mixture into the space 40), the springs 110 bring the pistons 2 together at a sufficiently rapid rate to allow the first combustion and working stroke to take place. Although not shown, air may be introduced to space 112 by a poppet valve 30 and associated system as described before or by an arrangement such as a port 113, which is vented to space 114, which may be connected to the atmospheric through a port such as 115. Port 113 is opened to space 112 each time piston 7 is at the bottom of its stroke.

Figure 8:
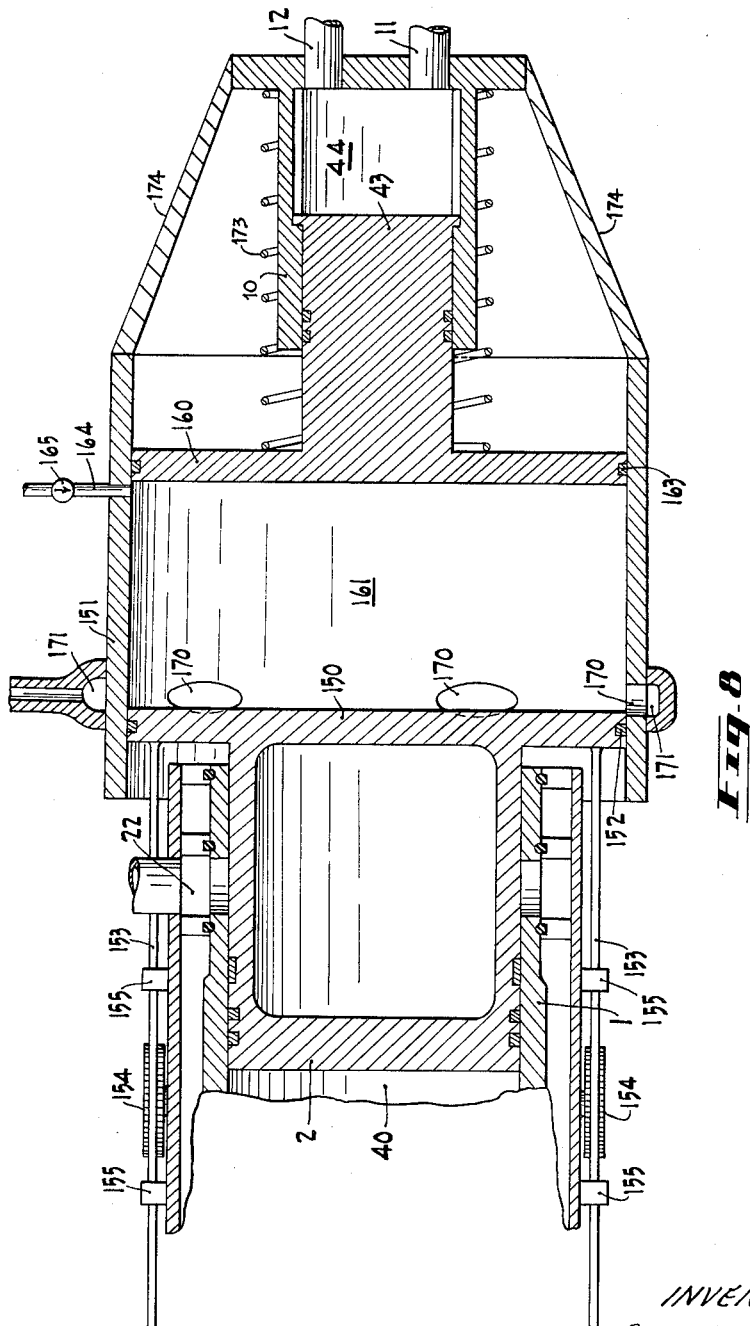
FIGURE 8 shows a sectioned, partly diagrammatical, plan view of a modified embodiment of the invention.

In the embodiment shown in FIGURE 8, piston 2 has been hollowed out and carries, on its side away from cylinder 1, an end piston 150 working in a bounce cylinder 151 within which it is sealed for sliding motion by ring 152. Brass support ring 15 for cylinder 2 is now no longer needed since end piston 150 serves in its stead. A rack and pinion synchroniser is shown in this modification and includes rods 153 carrying rack teeth (see also FIGURE 9) which engage with the gear wheels 154 mounted on the side of cylinder 1. Rods 153 are carried in sliders 155. It will be clear that piston 3 (not shown in FIGURE 8) also carries rods similar to 153 whose rack teeth mesh on the opposite sides of wheels 154, so that pistons 2 and 3 will move synchronously towards and away from one another. Cylinder 151 also accommodates bounce piston 160 integrally formed with hydraulic piston 43. A spring 173 has been shown for moving piston 43 to the left (so as to induce hydraulic fluid into space 44), this may, in some instances, be unnecessary if the pressure of the fluid fed into space 44 is sufficient to move the piston 43 to the top of its stroke during the working cycle of piston 2. Cylinder 10 is fixed to cylinder 151 by webs 174 and cylinder 151 is fixed by suitable means (not shown) such as abutting flanges formed on the two cylinders which can be bolted together, one method of fixing being described later with reference to FIGURE 9.

An inlet pipe 164 with check valve 165 allows the introduction of air under pressure to space 161 for starting. This is particularly simple since cylinder 151 is fixed. Catches (not shown but similar to catches 74 of FIGURE 4) fitted for instance for engagement with dogs on wheels 154 (which wheels also conveniently can be used for driving an injector pump, not shown, for fuel to be burnt in space 40) serve to hold piston 2 (and 3) in the position at the bottom of their strokes during which the compressed air is passed into space 161. The catches are then released to start the engine as described with reference to FIGURES 4 and 5. FIGURE 8 also shows a series of ports 170 leading into an annular manifold 171. These ports are opened to space 161 every time the piston 2 is at the top of its stroke. Manifold 171 may be bented to atmosphere, or, if desired, can be connected through pipe 172 to the supercharged induction system for cylinder 1 so that the pressure in space 161 is dependent upon the supercharging pressure and hence the power developed in the engine.

A further advantage of this embodiment is that heat generated within cylinder 1 is not immediately adjacent cylinder 151, which lessens any tendency to over-heating. By making cylinder 151 of large axial cross-sectional area, pressures within this cylinder are less than those in the embodiments described before and there is less tendency for leakage past the rings 152 and 163. The open arrangement of bounce piston 160, bounce cylinder 151 and hydraulic cylinder 10, avoids any possible contamination of hydraulic fluid by air on starting up. Finally, the use of the straight line synchronizer makes the presence of lugs, such as 18, unnecessary.

Figure 9:
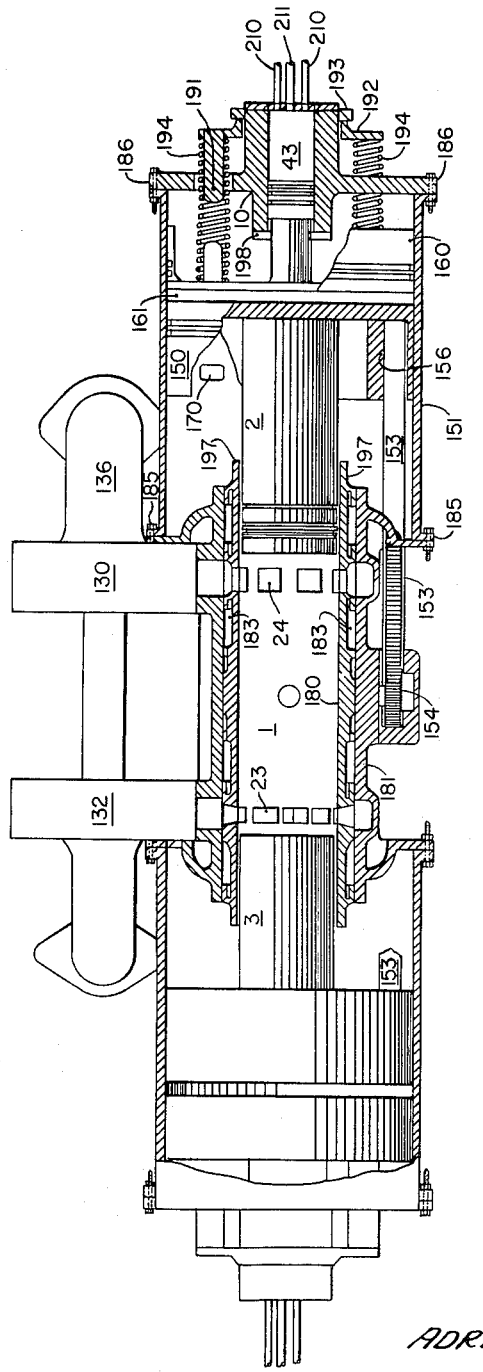
FIGURE 9 shows a particular construction in sectional plan view of an engine generally similar to that of FIGURE 8.

Reference will now be made to FIGURE 9 in which the same parts described for the earlier embodiments have the same reference numerals in FIGURE 9. In this instance, the cylinder 1 is formed by a liner 180 within a retaining cylinder block 181. The liner 180 is so shaped to permit the formation of coolant passage 183 between the liner and the block 181. The cylinder 151 is arranged to abut against the block 181 at 185 where they are bolted together and to receive the mounting shoulders 186 of cylinder 10, at 187 where they are bolted together. It can be seen that for better nesting, end piston 150 is shaped so that when piston 2 is at the top of its compression stroke, the projecting end 197 of block 181 is accommodated within the skirts of piston 150. Similarly, the projecting portion 198 of cylinder 10 is accommodated under the skirts of bounce piston 160. The springs 194 replace spring 173 of FIGURE 8 and are carried on projecting noses 191 of an adjustable bracket 192, which is located with respect to cylinder 10 by an adjusting nut 193 running in threads 194 on the surface of cylinder 10. It is convenient for there to be four springs 194 spaced equally around the axis of cylinder 10. Adjusting nut 193 enables the compression of springs 194 to be altered. In this embodiment, the hydraulic fluid has been shown as entering cylinder 10 through a pair of inlet pipes 210, which can contain check valves (not shown), and is expressed through a central pipe 211, which may also contain a check valve (not shown).

It will be noted in this embodiment that a single synchronizer rod 153 is employed for each cylinder 2 (and 3), rather than two for each, as shown in earlier described embodiments, and is used for starting in the manner described for FIGURE 8. One of the rods 153 may drive a fuel injector to inject a metered amount of fuel into cylinder 1 each combustion stroke. The second rods 153 for each cylinder 2 and 3 can be omitted because pistons 2 and 3 tend to remain in synchronism at all times, as expained before, and since the rear portions of the pistons 2 and 3 are supported by the end pistons 150, there is no tendency of any consequence for the piston 2 or 3 to be twisted in cylinder 1 when wheels 154 are latched for starting, even though there is pressure introduced to cylinder 161 at this time.

In a particular engine, the specifications were as shown in Table 1.

TABLE 1

| | |
|---|---|
| Bore | 3.25 ins. |
| Stroke | 4.5 ins. max. |
| Mass of piston 2 and piston 150 and synchronizer | 10 to 15 lbs. max. |
| Mass of piston 160 and piston 63 | 10 lbs. (approx.). |
| Maximum supercharge pressure ratio | 3:1. |
| Maximum compression ratio | 22:1. |
| Bore of hydraulic cylinder 10 | 1.5 ins. |
| Stroke of hydraulic piston 43 | 1.5 ins. max. |
| Bore of bounce cylinder 161 | 8 ins. |
| Pressure in bounce cylinder 161 | 250 lbs./in.² max. |
| Temperature in bounce cylinder 161 | 800° F. max. |

The temperatures and pressures in cylinder 1 are the same as those encountered in currently used opposed piston diesel engines.

| | |
|---|---|
| Hydraulic output pressure | 3000 lbs./in.² max., 1500 lbs./in.² min. |
| Normal hydraulic output pressure | 3000 lbs./in.². |
| Power cycles of engine per minute | 3000 cycles. |
| Speed of piston 2 | 60 ft./sec. max. |
| Speed of hydraulic piston 43 | 15 ft./sec. max. |
| Horse power produced per engine unit: | |
|     Unsupercharged | 40 H.P. |
|     Supercharged | 70 H.P. |
| Calculated weight per horse power | less than 2 lbs./H.P. |

Figure 10:
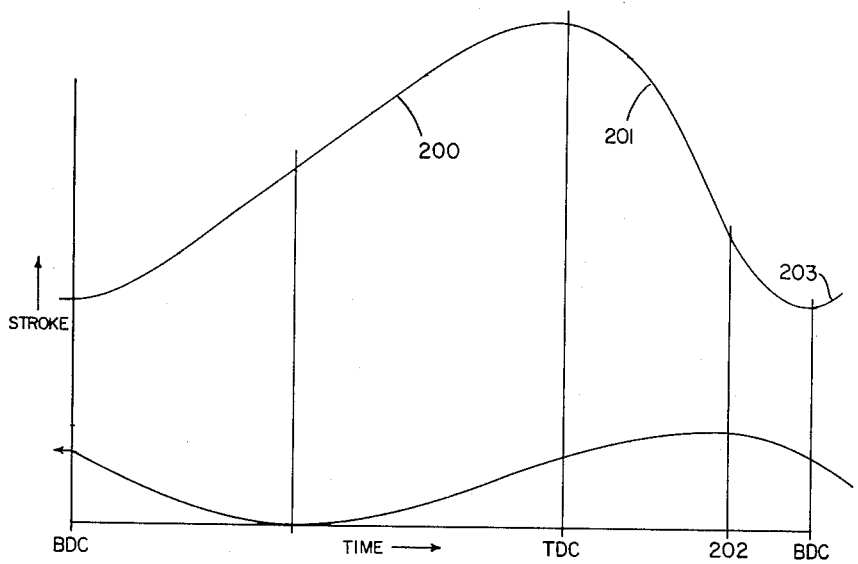
FIGURE 10 shows the relationship of stroke displacement against time for the engine of FIGURE 9.

FIGURE 10 shows the relationship between the stroke of piston 2 (or 3) and its associated hydraulic piston 43. Piston 2 reciprocates on a two-stroke cycle, and there is depicted the compression stroke 200, the power stroke 201, and the opening of the exhaust ports at 202. Both the top dead centre position and that of bottom dead centre will move inwards or outwards to a limited extent as the power demand on the engine varies, the higher outputs making for a longer stroke, but the firing frequency is little changed between idling and full output. It is interesting to note that the piston 43 executes an almost sinusoidal oscillation which is desirable since impulse stresses in cylinder 10 are avoided. The presence of spring 173 (or springs 194) is important in bringing about the sinusoidal motion since it causes the hydraulic compressor piston 43 to move as a simple harmonic system damped on its inward stroke into cylinder 10.

The throttle control for the engine, applied suitably at the turbo-charger intake, is operated in conjuction with the valve 103 (FIGURE 6) controlling the withdrawal of hydraulic fluid from cylinder 10 and the power developed in cylinder 1 is reduced as the requirement for pressure fluid is reduced.

I claim:
1. An engine for delivering hydraulic fluid under pressure which comprises, a cylinder, a piston in said cylinder for compressing a combustable charge therein and for extracting work from said charge upon combustion, a bounce cylinder fixed with respect to said cylinder, an end piston running in said bounce cylinder and operatively connected to said piston, a bounce piston in said bounce cylinder, a hydraulic compressing device, said bounce piston being operatively connected to press upon said hydraulic compressing device for expressing hydraulic fluid under pressure therefrom, said end piston compressing gas in said bounce cylinder and receiving kinetic energy from and returning kinetic energy to said piston in a direction opposite to that occasioned by said bounce piston.

2. An engine as defined in claim 1 wherein said hydraulic compressing device comprises, a hydraulic piston and cylinder and spring means for moving said hydraulic piston and cylinder relatively to one another in a direction opposite to that occasioned by said bounce piston.

3. An engine as defined in claim 2 comprising, means for leading gas to said bounce cylinder for super-charging said bounce cylinder in dependence upon the pressure of said combustible charge upon introduction to said first mentioned cylinder.

4. An engine as defined in claim 2 comprising, means for introducing gas to said bounce cylinder under pressure for urging said piston on its compression stroke, and means for retaining said piston against said last mentioned gas under pressure for release and starting of said engine.

5. An engine as defined in claim 2 said bounce piston and said hydraulic piston being integrally formed.

6. An engine as defined in claim 2 comprising, a scavenging means for encouraging introduction of fresh combustible charge to said cylinder and removal of exhaust therefrom.

7. An engine as defined in claim 2 comprising a pair of opposed pistons in said cylinder for compressing the combustible charge therein, and a bounce cylinder and an end piston running in the bounce cylinder and a hydraulic compressing device associated with each said opposed piston.

8. An engine as defined in claim 7 comprising a rack and pinion synchronizer for said opposed pistons.

9. An engine as defined in claim 7 wherein each said hydraulic compressing device comprises, a hydraulic piston and cylinder, said bounce piston being operative to move its hydraulic piston and cylinder relatively to one another, and spring means for moving each said hydraulic piston and cylinder relatively to one another in a direction opposite to that occasioned by its said bounce piston.

10. An engine for delivering hydraulic fluid under pressure which comprises, a cylinder, a piston in said cylinder for compressing a combustible charge therein and for extracting work from said charge upon said combustion, a bounce cylinder fixed with respect to said cylinder, an end piston running in said bounce cylinder and operatively connected to said piston, a bounce piston in said bounce cylinder, a hydraulic compressing device comprising a hydraulic piston and cylinder, said bounce piston being operatively connected to press upon said hydraulic compressing device for expressing hydraulic fluid under pressure therefrom spring means for moving said hydraulic piston and cylinder relatively to one another in a direction opposite to that occasioned by said bounce piston, said end piston compressing gas in said bounce cylinder and receiving kinetic energy from and returning kinetic energy to said piston, scavenging means for encouraging introduction of fresh combustible charge to said cylinder and removable of exhaust therefrom, said scavenging means comprising, an exhaust turbine, said turbine receiving exhaust gasses from said cylinder for driving said turbine, a charge compressor connected to said turbine, said compressor being connected to said cylinder for introducing a combustible charge into said cylinder.

References Cited by the Examiner

UNITED STATES PATENTS

| | | | |
|---|---|---|---|
| 1,294,271 | 2/19 | Humphrey et al. | 103—54 X |
| 2,387,603 | 10/45 | Neugebauer et al. | 230—56 |
| 2,978,986 | 4/61 | Carder et al. | 103—54 X |
| 3,065,703 | 11/62 | Harman | 230—49 X |

FOREIGN PATENTS

| | | |
|---|---|---|
| 405,008 | 11/42 | Italy. |

LAURENCE V. EFNER, *Primary Examiner.*

ROBERT M. WALKER, *Examiner.*